United States Patent [19]

Markvoort et al.

[11] Patent Number: 4,644,519
[45] Date of Patent: Feb. 17, 1987

[54] OPTICAL RECORDING PROVIDED WITH A CHALCOGENIDE RECORDING LAYER

[75] Inventors: Jan A. Markvoort; Wilhelmus G. V. M. Rippens, both of Eindhoven, Netherlands

[73] Assignee: U.S. Philips Corporation, New York, N.Y.

[21] Appl. No.: 615,854

[22] Filed: May 31, 1984

[30] Foreign Application Priority Data

Jun. 2, 1983 [NL] Netherlands .......................... 8301956

[51] Int. Cl.⁴ ................................................ G11B 7/24
[52] U.S. Cl. .................................................... 369/275
[58] Field of Search ............... 369/275, 100, 101, 109, 369/121, 122; 346/762, 135.1; 365/113; 430/945

[56] References Cited

U.S. PATENT DOCUMENTS

| | | | |
|---|---|---|---|
| 4,069,487 | 1/1978 | Kasai et al. | 346/76 L |
| 4,252,889 | 2/1981 | Tinet et al. | 369/275 |
| 4,282,534 | 8/1981 | Shinozaki et al. | 369/275 |
| 4,290,075 | 9/1981 | Jacobs et al. | 369/275 |
| 4,357,616 | 11/1982 | Terao et al. | 346/135.1 |
| 4,387,381 | 6/1983 | Bell | 346/135.1 |

Primary Examiner—Donald McElheny, Jr.
Attorney, Agent, or Firm—Norman N. Spain

[57] ABSTRACT

Optical recording element in which a transparent supporting substrate of a synthetic resin or provided with a coating layer of synthetic resin has a chalcogenide recording layer provided on one side of the synthetic resin and which recording layer is protected by damage from continuous laser light used for reading information recorded in the recording layer by a thermally conductive layer of chromium present on at least one surface of the chalcogenide recording layer.

4 Claims, 2 Drawing Figures

OPTICAL RECORDING PROVIDED WITH A CHALCOGENIDE RECORDING LAYER

BACKGROUND OF THE INVENTION

The invention relates to an optical recording element having a transparent supporting plate at least one side of the surface of which is manufactured from a synthetic resin or has a coating layer of a synthetic resin and a recording layer of a chalcogenide provided on the said side.

Such an optical recording element is known from Netherlands Patent Application No. 80 05 693 in the name of N. V. Philips' Gloeilampenfabrieken.

This known recording element comprises a transparent supporting plate of, for example, glass which has a layer of a cross-linked synthetic resin on one side. An optically readable servo track is provided in the synthetic resin layer in the form of a groove which may be provided with a finely detailed structure of servo areas the dimensions of which are in the order of magnitude of from one to a few microns. A recording layer of a chalcogenide is provided on the layer of synthetic resin. The chalcogenide layer in particular is a tellurium alloy, for example, an alloy of Te, Se, Sb and S. Data are recorded optically in the recording layer. For this purpose the optical recording element is rotated at, for example, a frequency of 4 Hz and the recording layer is exposed, via the transparent supporting plate, to energy-intensive laser light which is pulsated in accordance with the data to be recorded. The laser light follows the servo track. The recording material melts in the exposed places and a cavity or hole having a thickened edge portion is formed under the influence of the surface tension. Said information bits are arranged so as to form an information track which usually is spiral-like or consists of concentric circles. At the area of the holes the transmission of the recording layer for laser light is increased and the reflection is reduced. On the basis of this the information bits can be read with comparatively weak laser light. The known recording element has a great sensitivity to laser light. For example, the threshold energy of the recording layer $Te_{60}Se_{25}Sb_{10}S_5$ is approximately 0.5 nJ measured at a wavelength of 633 nm, a frequency of 4 Hz and a numerical aperture of the objective which focuses the laser light of 0.45. The threshold energy is the minimum energy required to provide a cavity or hole per laser light pulse. The pulse period is, for example, 100 ns.

Applicants have found that the quality of the above-mentioned sensitive recording element decreases in the course of time. For example, the signal-to-noise ratio decreases. Errors have also been established in tracking the servo track, in writing information and in reading same.

It has been found that the deterioration of the quality and the errors found are the result of the optical reading of the recorded data. During reading a continuous laser light beam is used, i.e. a non-pulsated light beam which is focused on the information track via the transparent supporting plate. The power of the laser upon reading is considerably smaller than that of the laser upon writing and is, for example, a factor 10 weaker. For example, the reading power is at most 1.3–1.4 mW and is preferably 0.4–1.3 mW. It has been found however, that upon reading, variations occur in the recording layer or in the synthetic resin surface adjoining said layer in spite of the low reading power.

It has become evident from investigations underlying the invention that the reading power used is very critical. For example, there exists a threshold-reading power above which variations are induced in the recording layer and/or the synthetic resin surface. Even different threshold powers can be distinguished independently of the manner of reading and of the nature of the variations. The following example serves for illustration.

The above-mentioned recording layer of $Te_{60}Se_{25}Sb_{10}Sb_5$ having a thickness of 23 nm has a crystalline structure which has been obtained by subjecting the layer to a thermal treatment during or after the manufacture. Upon reading information bits provided in said layer, no changes occur in the layer up to a reading power of approximately 0.8 mW.

With a reading power of approximately 0.8 to 1.0 mW changes are induced in the recording layer if the information track or a part of the information track, for example one track thereof, is read continuously for a longer period of, for example, 1 minute to 30 minutes, or if the track or a part thereof is read very frequently, for example, is read 250 to 7,000 times during the above-mentioned periods of 1 to 30 minutes. The changes are substantially a local transition from the crystalline recording material to a lesser ordered phase, in particular an amorphous phase. The amorphous spots in the recording material have optical properties different from the crystalline portions and, for example, are more transparent. As a result of this the quality of the recorded data and the quality of the reading (play-back) is detrimentally influenced. The signal-to-noise ratio decreases drastically.

With a reading power of approximately 1.0–1.2 mW damage occurs to the recording layer during continuous or frequent reading, the layer locally melting and becoming more transparent to laser light. Damage also occurs to the synthetic resin material on which the recording layer has been provided. The very finely structured servo track which is provided in the synthetic resin surface is damaged in particular. Tracking and recording of data is no longer possible.

With a reading power of approximately 1.2 to 1.5 mW, the conversion from crystalline to amorphous and the damage to the recording layer and the synthetic resin material (servo track) already occur after only one or a few readings.

The great sensitivity to damage and conversions from the crystalline to the amorphous state on frequent or continuous reading by means of a weak laser light beam are caused in Applicants' opinion particularly by the synthetic resin surface of the supporting plate or the synthetic resin layer on the supporting plate. Experiments have demonstrated that if the recording layer of, for example, $Te_{60}Se_{25}Sb_{10}S_5$ is provided directly on the glass surface of the supporting plate, the threshold power on frequent reading is 2.5 mW for the conversion from crystalline to amorphous and is 3 mW for small damage. A 2–3 fold increase of the threshold. In this case no problems occur on frequent reading with, for example, a laser power of at most 1.5 mW. The disadvantage is that no auxiliary track (servo track) can be provided in such an element. A further disadvantage is that the threshold sensitivity for the recording of information is more than doubled so that the useful life of the laser, in particular of the AlGaAs laser which in itself is interesting, is considerably reduced.

SUMMARY OF THE INVENTION

It is the object of the invention to provide a recording element of the type mentioned in the opening paragraph which does not exhibit the above-mentioned disadvantages or only to a small extent. A particular object is to provide a recording element in which no changes and in particular no damage occurs to the recording element on frequent or continuous reading with a laser power of approximately 0.4–1.3 mW.

A further object is to provide a recording element which has a great sensitivity to laser light, in particular to laser light having an emission wave length in the infrared range, so that information can be recorded with comparatively low laser light energy and a long useful life of the laser, in particular an AlGaAs laser, is reached.

According to still another object a recording element is provided which has an excellent signal-to-noise ratio upon reading the recorded data.

These objects are achieved by means of a recording layer, in which information bits, which are read by means of element of the type mentioned in the opening paragraph which is characterized in that a thin thermally conductive layer is provided on one side or on both sides of the recording continuous laser light, are formed in the recording layer by exposure to pulsated laser light which is focused on the recording layer via the supporting plate. As a result of which no noteworthy changes takes place in the recording layer or the synthetic resin occurring during reading.

The thin thermally conductive layer preferably has a maximum thickness of 30 nm. An example of a thermally conductive layer is a layer of a metal oxide, for example, $Al_2O_3$. The thermally conductive layer preferably is a metal layer.

The recording element in accordance with the invention is very sensitive to laser light and has an excellent signal-to-noise ratio with the comparatively low reading power of the laser used.

When a pulsated laser light beam is used in a preferred form, the recording element in accordance with the invention, has a special sensitivity to recording information of 0.4–1.0 nJ per information bit and a signal-to-noise ratio of at least 35 dB upon reading recorded information while using a continuous light beam originating from a laser having a power of 0.4–1.3 mW.

The laser used preferably is a semiconductor laser (AlGaAs laser) having an emission wavelength of approximately 800 nm.

The element according to the invention is read via the transparent supporting plate. The advantage of this is that contaminations on or damage to the surface of the supporting plate fall beyond the depth of focus of the objective which focuses the laser light on the recording layer upon recording or reading. Such contaminations and damage have no unfavourable influence on the quality of reading or recording.

A servo track is preferably provided in the synthetic resin surface of the supporting plate or in the synthetic resin layer present on the supporting plate. The servo track is an optically readable auxiliary track or conductive track in the form of a groove. The servo track may comprise an optically readable structure of servo areas situated alternately at a higher level and at a lower level, the so-called heading. Information with which the recording process is controlled is stored in the heading, for example, information regarding the place of recording. The track is read in reflection by means of laser light which is focused on the servo track via the supporting plate. Reading is based on phase differences between the forward and reflected laser light beams. The difference in height between the information areas is $k\lambda/4n$, where k is an integer, $\lambda$ is the wavelength of the reading laser light, and n is the refractive index of the supporting plate. The longitudinal dimensions of the information areas are small and are, for example, from 0.3 to 3 $\mu m$.

In a further preferred form of the recording element in accordance with the invention the thermally conductive layer is a partially transparent layer provided between the synthetic resin surface of the supporting plate and the recording layer. Both upon writing, hence recording of information, and upon reading thereof, a laser light beam is used which is focused on the recording layer through the transparent supporting plate. The laser light passes through the thermally conductive layer which is provided between the supporting plate and the recording layer. The thermally conductive layer should absorb and/or reflect as little laser light energy as possible. The term partially transparent layer is hence to be understood to mean a layer which passes the laser light partially. A suitable partially transparent thermally conductive layer is a thin metal layer having a maximum thickness of 20 nm. A good example hereof is a chromium layer having a thickness of 6 to 15 nm.

The thermally conductive layer may also be provided on the surface of the recording layer remote from the supporting plate. In that case the thermally conductive layers forms a top layer through which the laser light beam does not pass upon recording or reading information. The top layer has the extra advantage that the free surface of the recording layer is screened. The top layer need not be partially transparent. The top layer preferably is a metal layer, for example, a chromium layer having a thickness of at most 20 nm.

No or no noteworthy changes occur in the recording layer and synthetic resin layer when the recorded information is read frequently by means of a continuous laser light beam. No noteworthy conversion from crystalline to amorphous takes place in particular and no permanent damage is caused. As a result of the measure according to the invention the threshold power for the conversion from the crystalline-amorphous state and for damage upon frequent reading of the recording layer is increased by approximately 30 to 40%. This increase has proved to be sufficient to prevent or strongly suppress the above-mentioned changes in the recording layer upon frequent reading. The power used in reading is maximally 1.3–1.5 mW and is preferably between 0.4 and 1.3 mW. The threshold energy required for making an information bit (hole) in the recording layer is also increased but still remains comparatively very low. The increase of the threshold energy on a percentage basis may be significantly lower than the increase of the threshold voltage for the conversion from the crystalline to the amorphous state upon frequent reading. For example, when a 6 nm thick chromium layer is used between the supporting plate and the recording layer the threshold power upon frequent reading for the conversion of the crystalline to the amorphous state is increased from 0.9 to 1.3 mW. The threshold energy required to form a hole in the recording layer by means of pulsated laser light is increased from 0.50 to 0.55 nJ per pulse.

The recording layer formed of a chalcogenide used in the optical recording element according to the invention is preferably a layer of an alloy of tellurium with one or more of the following elements: Se, As, Sb, Bi, Ge, Sn, Si, Ga, Ind, Tb, S, Pb or an alloy of the suboxides of these elements. Such recording layers are very sensitive to the transition from the crystalline to the amorphous phase upon reading with a continuous laser light beam.

It should be noted that an optical recording element is disclosed in U.S. Pat. No. 4,189,735 which comprises a glass supporting plate which on one side is provided successively with a thermally conductive layer, in particular an Al layer, and a recording layer of, notably, MnBi or PtCo. The threshold power for the formation of information bits for MnBi is 175 mW and for PtCo is 880 mW. The optical recording element according to the U.S. Patent belongs to a different class of recording elements in which the recording sensitivity is very much lower than in the element according to the invention. In contrast with the element according to the invention the element according to the U.S. Patent does not have a supporting plate having a synthetic resin surface or a supporting plate provided with a coating layer of synthetic resin so that no servo track can be provided. The U.S. Patent does not mention the problems underlying the present invention, namely the conversions from the crystalline to the amorphous state and damage upon frequent reading. On the other hand, the problems underlying the U.S. Patent, namely that the signal-to-noise ratio depends on the value of the reading power of the laser, are not present in the element according to the invention. In the element according to the invention, for example, a reading power of 0.4 mW gives the same signal-to-noise ratio of 50-60 dB as a reading power of 1.1 mW. In the element according to the U.S. Patent a reading power of 10 mW is necessary for an MnBi layer to realize a signal-to-noise ratio of 40 dB. A reading power of 200 mW is necessary for a PtCo layer. The use of such reading powers as well as writing powers of 175 mW for MnBi and of 880 mW for PtCo, as stated in column 7 of the U.S. Patent, means a high energy consumption and a very low useful life of the laser, in particular an AlGaAs laser.

An optical recording element having a recording layer of a metal is described in the Patents Abstracts of Japan, Volume 7, No. 38, Feb. 16, 1983, p.42P176, JP-A-57189317. In order to increase the sensitivity and to be able to write with less energy, the metal recording layer comprises a second layer of a metal which serves as an anti-reflex coating with respect to the recording layer. It will be obvious that the objects of the present Application are essentially different from those according to the above Patent Abstracts of Japan. According to the present invention, on using a chalcogenide recording layer, a decrease of the sensitivity is obtained by using a thin thermally conductive layer and that in such manner that no problems occur upon reading.

DESCRIPTION OF THE PREFERRED EMBODIMENTS

Figure 1:
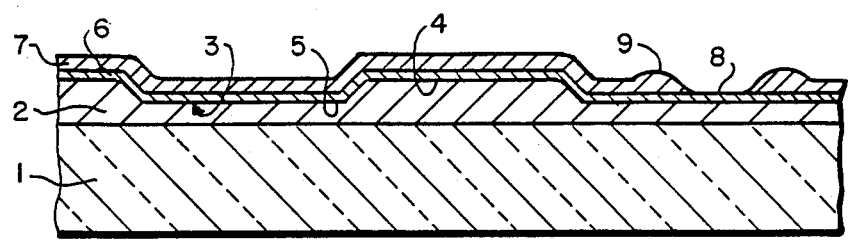
FIG. 1 is a tangential sectional view of an optical recording element of the invention and FIG. 2 is a tangential sectional view of another embodiment of the recording element for the invention.

Reference numeral 1 in FIG. 1 denotes a glass supporting plate having a thickness of 1.3 mm and a diameter of 30 cm. Supporting plate 1 comprises on one side a layer 2 of synthetic resin manufactured from an ultraviolet light-crosslinked acrylate synthetic resin. The synthetic resin layer has a thickness of 30 $\mu$m. At the surface remote from the supporting plate 1 the synthetic resin layer 2 has an optically readable servo track 3 which track comprises information areas situated alternately at a higher level 4 and at a lower level 5. The areas have longitudinal dimensions which vary from approximately 0.3 to 3 $\mu$m. The difference in height between the areas is k$\lambda$/4 n, wherein k is an integer, $\lambda$ is the wavelength of the laser light with which the servo track is read, and n is the refractive index of the material of the supporting plate. The difference in height usually is from 0.1 to 0.2 $\mu$m. The synthetic resin surface is covered with a thermally conducting, partially transparent layer 6 of chromium having a thickness of 6 nm. Layer 6 in turn is covered with a recording layer 7 of $Te_{80}Se_{13}Sb_4S_3$ having a thickness of 23 nm. The recording element is rotated at a frequency of 4 Hz and exposed to pulsated laser light which is focused on the recording layer 7 via the glass supporting plate 1, the transparent synthetic resin layer 2 and the chromium layer 6. The pulse period of the laser light is 100 ns. The emission wavelength of the laser light is 633 nm. The objective with which the laser light is focused on the recording layer 7 has a numerical aperture of 0.45. The power of the laser is continuously increased from an initial value, in which the quantity of laser light energy per pulse increases according to the series 0.30, 0.35, 0.40, 0.45, 0.50, 0.55, 0.60, 0.65, 0.70, 0.75, 0.80, 0.85 and 0.90 nJ. The minimum energy per pulse which is necessary to form in 100% of the exposures is determined, so as to form with each pulse, an information bit in recording layer 7, the information bit consisting of a hole 8 having a raised edge portion 9. This threshold energy for 100% holes is formed to be 0.55 nJ. The same test has been carried out with an element as described above in which the chromium layer 6 has a thickness of 10.5 nm. The threshold energy is 0.65 nJ. If chromium layer 6 is not present, the threshold energy for 100% holes is 0.50 nJ. The information bits thus produced are arranged in a spiral-like information track. The track is read by means of a non-pulsated continuous laser light beam which is focused on the recording layer 7 via glass plate 1. At the area of hole 8 the reflection is reduced so that the information bits can be traced on the basis of differences in reflection. In a series of tests always one track of the spiral-like information track is repeatedly read with the continuous laser light beam, the power of the laser being varied. A repeated or frequent reading is to be understood to mean a reading for half an hour in which the same track is read again and again by means of the continuous laser light beam. The results of the tests are recorded in the table below.

The composition of the recording element is stated in the first column of the table. These elements include those as shown in FIG. 1 or FIG. 2 as well as a comparison element which differs from the FIG. 1 element in that a chromium layer 6 is not present.

Figure 2:
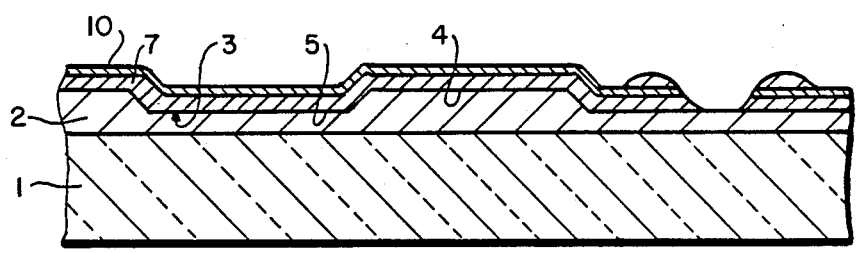

In FIG. 2 the same reference numerals are used as in FIG. 1 for corresponding components. The difference is that the FIG. 2 element does not comprise an intermediate layer 6 of chromium but a top layer 10 of chromium. The top layer 10 has a thickness of 3.5 nm.

The minimum laser power (threshold power) expressed in mW is recorded in the second column of the table on which as a result of the above-described frequent reading a conversion from the crystalline to the amorphous state takes place in the recording layer.

The minimum laser power (threshold power) is recorded in the third column of the table in which as a result of the frequent reading damage occurs to the recording layer as well as damage, for example, deformations, to the synthetic resin layer 2, in particular to servo track 3.

The last column of the table records the threshold energy in nJ in which information bits are formed by means of pulsated laser light. It concerns the minimum quantity of laser light energy per pulse necessary to form 100% holes upon recording information.

TABLE

| type of recording element | threshold power in mW for conversion from crystalline to amorphous upon frequent reading | threshold power in mW for damage upon frequent reading | threshold power in nJ per pulse upon recording |
|---|---|---|---|
| without Cr layer | 0.9 | 1.1 | 0.50 |
| with Cr intermediate layer | | | |
| 6 nm thick | 1.3 | 1.4 | 0.55 |
| 10.5 nm thick | 1.4 | 1.5 | 0.65 |
| 13.5 nm thick | 1.5 | >1.6 | 0.70 |
| with Cr top layer | | | |
| 3.5 nm thick | 1.3 | 1.4 | 0.75 |
| 7.5 nm thick | 1.6 | >1.6 | 0.90 |

The signal-to-noise ratio upon reading in all the cases was at least 35 dB. With a top layer of intermediate layer of Cr and a thickness of at most 6 nm the signal-to-noise ratio was 50–60 dB.

What is claimed is:

1. An optical recording element having a transparent supporting plate, at least one side of the surface of which is formed of a synthetic resin or is provided with a layer of a synthetic resin and a recording layer of a chalcogenide provided on said synthetic resin, which recording layer is capable upon exposure by means of pulsated laser light focused through said supporting layer to form therein information bits readable by means of continuous laser light, characterized in that a thermally conductive layer of chromium is present on at least one surface of said recording layer thereby preventing said continuous laser light from causing a noticeable change in said recording layer or in said synthetic resin.

2. An optical recording element as claimed in claim 1, characterized in that the thermally conductive layer is a semitransparent layer provided between the synthetic resin surface of the supporting plate and the recording layer.

3. An optical recording element as claimed in claim 1 or 2, characterized in that the thermally conductive layer is a chromium layer having a thickness of at most 20 nm.

4. An optional recording element as claimed in claim 1, characterized in that the recording layer has a threshold sensitivity to the formation of information bits of 0.40 to 1.0 nJ and a signal-to-noise ratio of at least 35 dB with a reading power of 0.4–1.3 mW.

* * * * *

UNITED STATES PATENT AND TRADEMARK OFFICE
CERTIFICATE OF CORRECTION

PATENT NO. : 4,644,519

DATED : February 17, 1987

INVENTOR(S) : Jan A. Markvoort et al

It is certified that error appears in the above-identified patent and that said Letters Patent is hereby corrected as shown below:

IN THE CLAIMS

Claim 1. line 8  change "layer" to --plate--

Signed and Sealed this

Thirteenth Day of December, 1988

Attest:

DONALD J. QUIGG

Attesting Officer

Commissioner of Patents and Trademarks